United States Patent [19]

Yamaoka et al.

[11] Patent Number: 4,732,940

[45] Date of Patent: Mar. 22, 1988

[54] CROSSLINKED RESIN COMPOSITIONS

[75] Inventors: Noboru Yamaoka, Yokohama; Kiyoyasu Tanabe, Tokyo; Katumi Usui; Takashi Mizoe, both of Yokohama; Kazuo Matsuura, Tokyo, all of Japan

[73] Assignee: Nippon Oil Company, Limited, Tokyo, Japan

[21] Appl. No.: 808,884

[22] Filed: Dec. 13, 1985

[30] Foreign Application Priority Data

Dec. 27, 1984 [JP]  Japan .................. 59-274121

[51] Int. Cl.$^4$ ............... C08L 23/26; C08L 23/12; C08L 23/18
[52] U.S. Cl. ................... 525/194; 525/193; 525/240
[58] Field of Search ............. 525/193, 194, 240

[56] References Cited

U.S. PATENT DOCUMENTS 3,806,558  4/1974  Fischer .
3,862,106  1/1975  Fischer .

FOREIGN PATENT DOCUMENTS 1271980   7/1968  Fed. Rep. of Germany .
55-071738  5/1980  Japan ................................. 525/194
58-157839  9/1983  Japan ................................. 525/240
157839     9/1983  Japan .
58-210949 12/1983  Japan ................................. 525/240
59-223740 12/1984  Japan ................................. 525/240

Primary Examiner—Carman J. Seccuro
Attorney, Agent, or Firm—Dilworth & Barrese

[57] ABSTRACT

A crosslinked resin composition obtained by crosslinking a composition comprising (A) 95–10 wt. % of a propylene polymer and (B) 5–90 wt. % of an ethylene/α-olefin copolymer having the following properties (I) to (iv) and prepared by copolymerizing ethylene with an α-olefin having 3 to 12 carbon atoms in the presence of a catalyst, said catalyst comprising a solid component and an organoaluminum compound, said solid component containing at least magnesium and titanium:

| | | |
|---|---|---|
| (i) | Melt index | 0.01–100 g/10 min |
| (ii) | Density | 0.860–0.910 g/cm$^3$ |
| (iii) | Maximum peak temperature measured according to a differential scanning calorimetry (DSC) | not lower than 100° C. |
| (iv) | Insolubles in boiling n-hexane | not less than 10 wt. % |

6 Claims, No Drawings

CROSSLINKED RESIN COMPOSITIONS

BACKGROUND OF THE INVENTION

The present invention relates to a crosslinked resin composition and more particularly to a resin composition superior in fluidity, permanent elongation and heat resistance, obtained by crosslinking a composition comprising a polypropylene resin and an ethylene copolymer of an extremely low density which copolymer is obtained by copolymerizing ethylene with an α-olefin in the presence of a specific catalyst.

Polypropylene has widely been used as automobile parts, electric household products and parts and mechanical parts because of its superior mechanical physical properties. However, it is inferior in impact strength, especially impact strength at low temperatures, and therefore its application range is limited. In order to remedy such a drawback, there have been proposed several methods in which polypropylene is blended with a rubber component. For example, in Japanese Patent Laid Open No. 157839/83 there is described a resin composition comprising a specific ethylene/α-olefin copolymer and polypropylene. Although this composition has an improved impact strength, it is not so greatly improved in fluidity and heat resistance, nor is it improved in permanent elongation. Thus there remain problems in point of moldability and physical properties of molded products.

SUMMARY OF THE INVENTION

It is an object of the present invention to overcome the above-mentioned drawbacks of the prior art.

It is another object of the present invention to provide a crosslinked resin composition superior in fluidity, permanent elongation and heat resistance.

The present invention resides in a crosslinked resin composition obtained by crosslinking a composition comprising (A) 95–10 wt. % of a propylene polymer and (B) 5–90 wt. % of an ethylene/α-olefin copolymer having the following properties (i) to (iv) and prepared by copolymerizing ethylene with an α-olefin having 3 to 12 carbon atoms in the presence of a catalyst which catalyst comprises a solid component and an organoaluminum compound, the solid component containing at least magnesium and titanium:

| | | |
|---|---|---|
| (i) | Melt index | 0.01–100 g/10 min |
| (ii) | Density | 0.860–0.910 g/cm$^3$ |
| (iii) | Maximum peak temperature measured according to a differential scanning calorimetry (DSC) | not lower than 100° C. |
| (iv) | Insolubles in boiling n-hexane | not less than 10 wt. % |

The present invention also resides in a resin composition obtained by further adding a propylene polymer to the above crosslinked composition in such a range of an amount as satisfies the requirement that the proportion of the ethylene/α-olefin copolymer (B) in the resulting composition should be in the range of 5 to 90 wt. %.

DESCRIPTION OF THE PREFERRED EMBODIMENTS

Crosslinked resin compositions obtained according to the present invention have the following advantages.

(a) Superior in fluidity, so easy to mold, giving molded products having a good appearance.
(b) Superior heat resistance permits use even at elevated temperatures under direct sunlight, etc.
(c) Small permanent elongation makes deformation difficult.
(d) Superior resistance to whitening.
(e) Superior transparency.

Since the compositions of the present invention have such excellent advantages, their application range is extremely wide. The following are their application examples:

(a) automobile bumper and instrument panel
(b) interior and exterior material for automobile
(c) large-sized moldings
(d) sports goods
(e) hot water pipe
(f) material for various covers
(g) air duct
(h) various packings The present invention will be described below more concretely.

(1) Propylene Polymer (A)

In addition to propylene homopolymer, block and random copolymers with other copolymer components are mentioned as examples of the propylene polymer (A) used in the present invention. Preferred examples of copolymer components are α-olefins having 2 to 8 carbon atoms such as ethylene, butene-1, hexene-1, 4-methylpentene-1 and octene-1. It is preferable that the content of these copolymer components in copolymer be not more than 30 wt. %.

The melt flow rate (MFR, according to JIS K 6758) of the propylene polymer is in the range of 0.01 to 100 g/10 min, preferably 0.1 to 30 g/10 min. If MFR is less than 0.01 g/10 min, it will be impossible to obtain a resin composition having a good fluidity, and if MFR exceeds 100 g/10 min, the tensile strength and impact strength will be reduced. Thus both such values are undesirable.

(2) Ethylene/α-Olefin Copolymer (B)

In the ethylene/α-olefin copolymer (B) used in the present invention, the α-olefin to be copolymerized with ethylene is one having 3 to 12 carbon atoms. Examples are propylene, butene-1, 4-methylpentene-1, hexene-1, octene-1, decene-1 and dodecene-1. Particularly preferred are propylene, butene-1, 4-methylpentene1 and hexene-1. Further, dienes such as, for examples, butadiene and 1,4-hexadiene may be used as comonomers. It is preferable that the α-olefin content in the ethylene/α-olefin copolymer be in the range of 5 to 40 mol %.

The following description is provided about how to prepare the ethylene/α-olefin copolymer used in the present invention.

The catalyst system used comprises a solid catalyst component and an organoaluminum compound, the solid catalyst component containing at least magnesium and titanium. For example, the solid catalyst component is obtained by supporting titanium compound on an inorganic solid compound containing magnesium by a known method. Examples of magnesium-containing inorganic solid compounds include, in addition to metal magnesium, magnesium hydroxide, magnesium carbonate, magnesium oxide, magnesium chloride, as well as double salts, double oxides, carbonates, chlorides and hydroxides, which contain magnesium atom and a metal selected from silicon, aluminum and calcium, further, these inorganic solid compounds after treatment or reaction with oxygencontaining compounds, sulfur-containing compounds, aromatic hydrocarbons or halogen-containing substances.

As examples of the above oxygen-containing compounds are mentioned organic oxygen-containing compounds such as water, alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounes such as thiols, thio-ethers and the like, inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxyhalides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides obtained by reducing titanium tetrahalides such as titanium tetrachloride and titanium tetrabromide with hydrogen, aluminum, titanium or an organometallic compound of a Group I–III metal in the Periodic Table, as well as trivalent titanium compounds obtained by reducing tetravalent alkoxytitanium halides of the general formula $Ti(OR)_mX_{4-m}$ with an organometallic compound of a Group I–III metal in the Periodic Table in which formula R is an alkyl, aryl or aralkyl group having 1 to 20 carbon atoms, X is a halogen atom and m is $0 < m < 4$. Tetravalent titanium compounds are particularly preferred.

As preferred examples of catalyst systyms are mentioned combinations of organoaluminum compounds with such solid catalyst components as $MgO-RX-TiCl_4$ (Japanese Patent Publication No. 3514/76; the following parenthesized Publication and Laid Open Nos. also mean Japanese Patent Publication and Japanese Patent Laid Open Nos. respectively), $Mg-SiCl_4-ROH-TiCl_4$ (Publication No. 23864/75), $MgCl_2-Al(OR)_3-TiCl_4$ (Publication No. 152/76 and No. 15111/77), $MgCl_2-SiCl_4-ROH-TiCl_4$ (Laid Open No. 106581/74), $Mg(OOCR)_2-Al(OR)_3-TiCl_4$ (Publication No. 11710/77), $Mg-POCl_3-TiCl_4$ (Publication No. 153/76), $MgCl_2-AlOCl-TiCl_4$ (Publication No. 15316/79) and $MgCl_2-Al(OR)_nX_{3-n}-Si(OR')_mX_{4-m}-TiCl_4$ (Laid Open No. 95909/81), in which formulae R and R' are each an organic radical and X is a halogen atom.

As other examples of catalyst systems are mentioned combinations of organoaluminum compounds with reaction products as solid catalyst components obtained by the reaction of organomagnesium compounds such as so-called Grignard compounds with titanium compounds. Examples of organomagnesium compounds are those of the general formulae $RMgX$, $R_2Mg$ and $RMg(OR)$ wherein R is an organic radical having 1 to 20 carbon atoms and X is a halogen atom, and ether complexes thereof, as well as modified compounds obtained by modifying these organomagnesium compounds with other organometallic compounds such as, for example, organosodium, organolithium, organopotassium, organoboron, organocalcium and organozinc.

More concrete examples of such catalyst systems are combinations of organoaluminum compounds with such solid catalyst components as $RMgX-TiCl_4$ (Publication No. 39470/75), $RMgX-phenol-TiCl_4$ (Publication No. 12953/79), $RMgX-halogenated phenol-TiC_4$ (Publication No. 12954/79) and $RMgX-CO_2-TiCl_4$ (Laid Open No. 73009/82).

As still other examples of catalyst systems are mentioned combinations of organoaluminum compounds with solid products obtained by contacting such inorganic oxides as $SiO_2$ and $Al_2O_3$ with the solid catalyst component containing at least magnesium and titanium. In addition to $SiO_2$ and $Al_2O_3$ there also may be mentioned $CaO$, $B_2O_3$ and $SnO_2$ as examples of inorganic oxides. Double oxides thereof are also employable without any trouble. For contacting these inorganic oxides with the solid catalyst component containing magnesium and titanium, there may be adopted a known method. For example, both may be reacted at a temperature of 20° to 400° C., preferably 50° to 300° C., usually for 5 minutes to 20 hours, in the presence or absence of an inert solvent, or both may be subjected to a co-pulverization treatment, or there may be adopted a suitable combination of these methods.

As more concrete examples of such catalyst systems, mention may be made of combination of organoaluminum compounds with $SiO_2-ROH-MgCl_2-TiCl_4$ (Laid Open No. 47407/81), $SiO_2-R-O-R'-MgO-AlCl_3-TiCl_4$ (Laid Open No. 187305/82) and $SiO_2-MgCl_2-Al(OR)_3-TiCl_4-Si(OR')_4$ (Laid Open No. 21405/83) in which formulae R and R' are each a hydrocarbon radical.

In these catalyst systems the titanium compounds may be used as adducts with organocarboxylic acid esters, and the magnesium-containing inorganic solid compounds may be used after contact treatment with organic carboxylic acid esters. Moreover, the organoaluminum compounds may be used as adducts with organocarboxylic acid esters. Further, the catalyst systems may be prepared in the presence of organic carboxylic acid esters.

As organic carboxylic acid esters there may be used various aliphatic, alicyclic and aromatic carboxylic acid esters, preferably aromatic carboxylic acid esters having 7 to 12 carbon atoms. Examples are alkyl esters such as methyl and ethyl of benzoic, anisic and toluic acids.

As preferred examples of the organoaluminum compound to be combined with the solid catalyst component are mentioned those represented by the general formulae $R_3Al$, $R_2AlX$, $RAlX_2$, $R_2AlOR$, $RAl(OR)X$ and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound.

The catalyst system exemplified above may be contacted with an $\alpha$-olefin before its used in the polymerization reaction. By so doing, its polymerization activity can be greatly improved and a stabler operation is ensured as compared with the case where it is not so treated. In this case, various $\alpha$-olefins are employable, but preferably those having 3 to 12 carbon atoms and more preferably those having 3 to 8 carbon atoms. Examples are propylene, butene-1, pentene-1, 4-methylpentene-1, hexene-1, octene-1, decene-1, dodecene-1, and mixtures thereof. The temperature and time of the contact between the catalyst system and $\alpha$-olefin can be selected over a wide range, for example, 0°-200° C., preferably 0°-110° C., and 1 minute to 24 hours. The amount of the $\alpha$-olefin to be contacted with the catalyst system can also be selected over a wide range, but usually it is desirable that the catalyst system be treated with 1 g to 50,000 g, preferably 5 g to 30,000 g, per gram of the solid catalyst component of the $\alpha$-olefin and reacted with 1 g to 500 g per gram of the solid catalyst component of the $\alpha$-olefin. The pressure in the contact treatment is not specially limited, but preferably it is in the range of $-1$ to 100 kg/cm$^2$.G.

In the $\alpha$-olefin treatment, the catalyst system may be contacted with the $\alpha$-olefin after combining the total amount of the organoaluminum compound used with the solid catalyst component, or the catalyst system may be contacted with the $\alpha$-olefin after combining a part of the organoaluminum compound used with the solid catalyst component and the remaining portion of the organoaluminum compound may be added separately in the polymerization reaction. The contact treatment of the catalyst system with the $\alpha$-olefin may be conducted in the presence of hydrogen gas or any other inert gas, e.g. nitrogen, argon or helium.

The polymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Olefin polymerizing conditions involve temperatures in the range of 20° to 300° C., preferably 40° to 200° C., and pressures in the range from normal pressure to 70 kg/cm$^2$.G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble.

The melt index (MI, according to JIS K 6760) of the ethylene/$\alpha$-olefin copolymer thus prepared is in the range of 0.01 to 100 g/10 min, preferably 0.1 to 50 g/10 min. Its density (according to JIS K 6760) is in the range of 0.860 to 0.910 g/cm$^3$, preferably 0.870 to 0.905 g/cm$^3$ and more preferably 0.870 to 0.900 g/cm$^3$. Its maximum peak temperature (Tm) measured according to a differential scanning calorimetry (DSC) is not lower than 100° C., preferably not lower than 110° C. Its insolubles in boiling n-hexane are not less than 10 wt. %, preferably 20-95 wt. % and more preferably 20-90 wt. %.

If the melt index of the ethylene/$\alpha$-olefin copolymer is less than 0.01 g/10 min, the compatibility with the propylene polymer and its fluidity will be deteriorated, and if it exceeds 100 g/10 min, the tensile strength will be reduced. Thus both such values are undesirable. A density thereof lower than 0.860 g/cm$^3$ would cause a lowering in tensile strength, create a surface stickiness of the resin composition and impair the appearance, and a density thereof exceeding 0.910 g/cm$^3$ would cause a reduction of elongation. Thus both such density values are undesirable. A maximum peak temperature thereof measured according to DSC of lower than 100° C. would cause a lowering of tensile strength and of heat resistance and create a surface stickiness of the resin composition and is thus undesirable. If the proportion of insolubles in boiling n-hexane is less than 10 wt. %, the resultant composition will be reduced in tensile strength and become sticky on its surface and thus such a proportion is not desirable.

(3) Composition Ratio (Blending Ratio)

The composition ratio, (A)/(B), of the propylene polymer (A) to the ethylene/$\alpha$-olefin copolymer (B) in the resin composition of the present invention is 95-10-/5-90 (wt. % ratio), preferably 80-10/20-90 (wt. % ratio). A proportion of the ethylene/$\alpha$-olefin copolymer exceeding 90 wt. % is not desirable because it would result in deteriorated fluidity and heat resistance, and a proportion thereof less than 5 wt. % is not desirable, either, because it would cause an increase of permanent elongation.

If the above composition is crosslinked and then further blended with a propylene polymer so that the proportion of the ethylene/$\alpha$-olefin copolymer is in the range of 5 to 90 wt. % of the total amount of the composition, it will become well balanced in processability and physical properties. In this case, the propylene polymer may be the same as or different from the one used in the preparation of the crosslinked composition.

(4) Preparation of the Crosslinked Composition

The crosslinked resin composition of the present invention can be prepared by blending the propylene polymer (A) with the ethylene/$\alpha$-olefin copolymer (B) intimately in the foregoing composition ratio (blending ratio) and crosslinking the composition.

Any known method may be adopted for obtaining the crosslinked composition. A typical example is a mechanical melt-kneading method whereby a partial crosslinking can be attained using a uni- or biaxial extruder, a Banbury mixer or a kneader. Alternatively, after impregnation of a crosslinking agent, it is possible to effect crosslinking by utilization of heat or radiation.

As the crosslinking agent, an organic peroxide is usually employed. Examples are 2,5-dimethyl-2,5-di(t-butylperoxy)hexane, di-t-butyl peroxide, di(t-butylperoxy)diisopropylbenzene, di(t-butylperoxy)diisobutylbenzene, dicumyl peroxide, t-butylcumyl peroxide, t-butylperoxybenzoate, 1,1-bis(t-butylperoxy)3,3,5-trimethyl peroxide, benzoyl peroxide, and p-chlorobenzoyl peroxide.

There may be used a crosslinking aid together with the crosslinking agent. Examples are liquid polybutadiene, divinylbenzene, ethylene dimethacrylate and diallyl phthalate.

The amount of the crosslinking agent used is in the range of 0.005 to 3 wt. %, preferably 0.1 to 1.5 wt. %, provided this range does not always constitute a limitation because the amount of the crosslinking agent used is determined according to the performance required for the crosslinked composition.

Further, several kinds of crosslinking agents and crosslinking aids may be used together according to purposes.

The crosslinked composition thus obtained may be further blended intimately with a propylene polymer so that the content of the ethylene/α-olefin copolymer is in the range of 5 to 90 wt. %.

Before or after crosslinking, or during cross-linking (particularly during melt-kneading), there may be added, if necessary, fillers, antioxidants, flame-retardants and coloring agents, e.g. carbon black, calcium carbonate, silica, metallic fibers and carbon fibers.

The following examples are given to further illustrate the present invention, but the invention is not limited thereto. First, physical properties in the following working examples and comparative examples were measured in the following manner.

[-Preparing Test Sheet]

Each resin composition obtained was placed in a mold 150 mm long by 150 mm wide by 2 mm thick, preheated at 210° C. for 5 minutes, then pressure-molded for 5 minutes at the same temperature and at 150 kg/cm².G and thereafter cooled for 10 minutes at 30° C. under the pressure of 150 kg/cm².G, followed by annealing at 50° C. for 20 hours and then allowing to stand at room temperature for 24 hours. Thereafter, physical properties were measured.

[Tensile Test]

Test piece was made using No. 3 dumbbell in accordance with JIS K 6301 and it was measured for tensile strength at a pulling rate of 50 mm/min.

[Permanent Elongation]

Test piece was made using No. 3 dumbbell in accordance with JIS K 6301. It was held at a 100% elongated state for 10 minutes, then contracted suddenly and allowed to stand for 10 minutes to check a percentage elongation, from which was determined a permanent elongation.

[Vicat Softening Point]

A 3 mm thick specimen was made in accordance with the test sheet preparing method and it was used for measurement. A heat transfer medium was heated at a rate of 50° C./60 min while applying a load of 1 kg through a needle-like indenter placed perpendicularly to the specimen in a heating bath, and the temperature of the heat transfer medium when the needle-like indenter permeated 1 mm was regarded as a Vicat softening point.

[Gel Percentage]

A 200 μm thick sheet was made using a hot press (at 200° C. for 5 minutes), then three sheets each 40 mm by 20 mm were cut out and each placed in a 120-mesh wire gauze bag and extracted in boiling xylene for 5 hours using a double-tube Soxhlet extractor. Boiling xylene insolubles were taken out and vacuum-dried (80° C., 7 hours) for determination as gel percentage.

[Whitening Test]

A 2 mm thick sheet was folded 180° by hand, then returned to the original state, and whether the fold was whitened or not was judged visually. Evaluation was made as "yes" for a completely whitened fold, "a little" for a slightly whitened fold and "none" for a whitening-free fold.

[How to Determine Insolubles in Boiling n-Hexane]

A 200 μm thick sheet was formed using a hot press, from which were then cut out three sheets each 20 mm long by 30 mm wide. Using these sheets, extraction was made in boiling n-hexane for 5 hours by means of a double-tube type Soxhlet extractor. n-Hexane insolubles were taken out and vacuum-dried (50° C., 7 hours), then the percentage insolubles in boiling n-hexane was calculated in accordance with the following equation:

$$\text{Insolubles in boiling n-hexane (wt. \%)} = \frac{\text{Weight of Extracted Sheet}}{\text{Weight of Unextracted Sheet}} \times 100 \text{ (wt. \%)}$$

[Measurement by DSC]

About 5 mg of a specimen was accurately weighed from a hot-pressed 100 μm thick film and then set on a differential scanning calorimeter. The temperature was raised to 170° C. and the specimen was held at this temperature for 15 minutes, thereafter cooled to 0° C. at a rate of 2.5° C./min. Then, from this state the temperature was raised to 170° C. at a rate of 10° C./min. The temperature at the vertex position of the maximum peak of peaks which appeared during the heat-up period from 0° to 170° C. was regarded as Tm.

EXAMPLE 1

An ethylene/butene-1 copolymer was obtained by copolymerizing ethylene with butene-1 using a catalyst comprising a solid catalyst component and triethylaluminum, the solid catalyst component having been obtained from a substantially anhydrous magnesium chloride, 1,2-dichloroethane and titanium tetrachloride. The ethylene content, melt index, density, maximum peak temperature by DSC and boiling n-hexane insolubles of this ethylene/butene-1 copolymer were 88.3 mol %, 0.9 g/10 min, 0.896 g/cm³, 119.8° C. and 82 wt. %, respectively.

28 g of the ethylene/butene-1 copolymer powder, 12 g of a polypropylene homopolymer powder having an MFR of 1.5 g/10 min, 1 part by weight of di(t-butylperoxy)diisopropylbenzene as a crosslinking agent, 0.1 part by weight of Irganox 1010 (trade name, a product of Ciba-Geigy AG) as an antioxidant and 0.1 part by weight of calcium stearate (each part by weight is based on 100 parts by weight of the polymer) were dry-blended and then introduced into a Bumbury's mixer (Brabender, capacity 60 ml), in which kneading was made for 15 minutes at a rotor revolution as 40 rpm to obtain a partially crosslinked composition. Results of measurement of various physical properties are as set out in Table 1.

EXAMPLE 2

23 g of the crosslinked composition obtained in Example 1 and 17 g of the same polypropylene homopolymer as that used in Example 1 were kneaded by the above Brabender at 200° C., 40 rpm for 10 minutes. Results of measurement of various physical properties of the resultant composition are as set out in Table 1.

EXAMPLE 3

Experiment was made in the same manner as in Example 1 except that there was used an ethylene/butene-1 copolymer prepared in the manner described in Example 1 and having an ethylene content of 82.7 mol %, a melt index of 1.0 g/10 min, a density of 0.892 g/cm$^3$, a maximum peak temperature by DSC of 119.3° C. and 74 wt. % of insolubles in boiling n-hexane. Results are as set out in Table 1.

EXAMPLE 4

Experiment was made in the same manner as in Example 1 except that a propylene-ethylene block copolymer (ethylene content: 5.9 mol %) having an MFR of 0.7 g/10 min was used in place of the polypropylene homopolymer. Results are as set out in Table 1.

COMPARATIVE EXAMPLE 1–4

Experiments were made in the same manner as in Examples 1–4 respectively except that merely blended systems were used without adding any crosslinking agent. Results are as set out in Table 2.

COMPARATIVE EXAMPLE 5

Experiment was made in the same manner as in Example 1 except that there was used an ethylene/butene-1 copolymer prepared in the manner described in Example 1 and having an ethylene content of 97 mol %, a melt index of 0.9 g/10 min, a density of 0.921 g/cm$^3$, a maximum peak temperature by DSC of 124.1° C. and 98 wt. % of insolubles in boiling n-hexane. Results are as set out in Table 2. The tensile elongation of this polymer was as small as 45% and it was impossible to measure its permanent elongation.

TABLE 1

|  | Melt Flow Rate *1 (230° C., 2.16 kg) g/10 min | Melt Flow Rate *1 (230° C., 21.6 kg) g/10 min | Gel Percentage wt. % | Tensile Strength kg/cm$^2$ | Vicat Soften Point °C. | Permanent Elongation % | Whitening State |
| --- | --- | --- | --- | --- | --- | --- | --- |
| Example 1 | 0.01 | 170 | 48 | 170 | 91 | 35 | none |
| Example 2 | 1.4 | above 250 | 25 | 204 | 125 | 33 | a little |
| Example 3 | 0.01 | 172 | 51 | 169 | 85 | 33 | none |
| Example 4 | 0.00 | 45 | 48 | 170 | 88 | 35 | none |

*1 The values shown are of crosslinked compositions.

TABLE 2

|  | Melt Flow Rate (230° C., 2.16 kg) g/10 min | Melt Flow Rate (230° C., 21.6 kg) g/10 min | Gel Percentage wt. % | Tensile Strength kg/cm$^2$ | Vicat Soften Point °C. | Permanent Elongation % | Whitening State |
| --- | --- | --- | --- | --- | --- | --- | --- |
| Comparative Example 1 | 1.6 | 130 | 0 | 190 | 65 | 48 | yes |
| Comparative Example 2 | 1.7 | 220 | 0 | 360 | 125 | 75 | yes |
| Comparative Example 3 | 1.8 | 150 | 0 | 170 | 64 | 51 | yes |
| Comparative Example 4 | 1.3 | 84 | 0 | 120 | 65 | 40 | yes |
| Comparative Example 5 | 0.01 | 141 | 36 | 150 | 110 | — *1 | a little *2 |

*1 Could not be measured because of only 45% elongation.
*2 Cracked.

What is claimed is:

1. A crosslinked resin composition obtained by crosslinking a composition consisting essentially of (A) 80–10 wt. % of a propylene polymer and (B) 20–90 wt. % of an ethylene/α-olefin compolymer having the following properties (i) to (iv) and prepared by copolymerizing ethylene wiht an α-olefin having 3 to 12 carbon atoms in the presence of a catalyst, said catalyst comprising a solid component and an organoaluminum compound, said solid component containing at least magnesium and titanium:

| (i) Melt index | 0.01–100 g/10 min. |
| --- | --- |
| (ii) Density | 0.870–0.905 g/cm$^3$ |
| (iii) Maximum peak temperature measured according to a differential scanning calorimetry (DSC) | not lower than 100° C. |
| (iv) Insolubles in boiling n-hexane | not less than 10 wt. %. |

2. A crosslinked resin composition as set forth in claim 1, wherein the α-olefin in the ethylene/α-olefin copolymer is an α-olefin having 3 to 6 carbon atoms.

3. A resin composition obtained by adding a propylene polymer to the crosslinked resin composition of claim 1 in such a range of an amount as satisfies the content of the ethylene/α-olefin copolymer (B) of 20–90 wt. % in the resulting composition.

4. A process for preparing a crosslinked resin composition, said process comprising crosslinking a composition consisting essentially of (A) 80–10 wt. % of a propylene polymer and (B) 20–90 wt. % of an ethylene/α-olefin copolymer prepared by copolymerizing ethylene with an α-olefin having 3 to 12 carbon atoms in the presence of a catalyst, said catalyst comprising a solid component and an organoaluminum compound, said solid component containing at least magnesium and titanium and said ethylene/α-olefin copolymer having the following properties (i) to (iv):

| | | |
|---|---|---|
| (i) | Melt index | 0.01–100 g/10 min. |
| (ii) | Density | 0.870–0.905 g/cm³ |
| (iii) | Maximum peak temperature measured according to a differential scanning calorimetry (DSC) | not lower than 100° C. |
| (iv) | Insolubles in boiling n-hexane | not less than 10 wt. %. |

5. The process of claim 4 wherein the α-olefin of the ethylene/α-olefin copolymer is an α-olefin having 3 to 6 carbon atoms.

6. The process of claim 4 comprising the further step of blending additional propylene polymer with the crosslinked resin composition in a amount to result in an ethylene/α-olefin copolymer content of 20–90 wt. % of the total composition.

* * * * *